(12) United States Patent
Lin

(10) Patent No.: US 11,945,551 B2
(45) Date of Patent: Apr. 2, 2024

(54) BACKREST ADJUSTMENT STRUCTURE FOR BOAT SEAT

(71) Applicant: Fujian Doofar Outdoor Sporting Goods Co., Ltd., Longyan (CN)

(72) Inventor: Xizhen Lin, Longyan (CN)

(*) Notice: Subject to any disclaimer, the term of this patent is extended or adjusted under 35 U.S.C. 154(b) by 254 days.

(21) Appl. No.: 17/586,728

(22) Filed: Jan. 27, 2022

(65) Prior Publication Data

US 2023/0234678 A1  Jul. 27, 2023

(51) Int. Cl.
*B63B 29/04* (2006.01)
*B60N 2/22* (2006.01)

(52) U.S. Cl.
CPC ...... *B63B 29/04* (2013.01); *B60N 2002/2204* (2013.01); *B63B 2029/043* (2013.01)

(58) Field of Classification Search
CPC ............ A47C 7/402; A47C 7/405; B60N 2002/2204; B60N 2/643; B60N 2/2222; B63B 29/04; B63B 2029/043
USPC ........................................... 297/353
See application file for complete search history.

(56) References Cited

U.S. PATENT DOCUMENTS

| 3,708,189 A * | 1/1973 | Good ............ F16C 11/04 403/151 |
| 6,718,905 B1* | 4/2004 | Peerson ............ B63B 29/04 114/347 |
| 9,783,092 B2* | 10/2017 | Bergmark ............ B60N 2/686 |
| 2002/0175542 A1* | 11/2002 | McDonough ........... B63B 34/21 297/195.11 |
| 2006/0202533 A1* | 9/2006 | Goodman ............ A47C 7/402 297/352 |

FOREIGN PATENT DOCUMENTS

| GB | 2401539 A | * 11/2004 | ............ B63B 29/04 |
| SE | 426352 B | * 1/1983 | ............ A47C 7/405 |
| WO | WO-9628996 A1 | * 9/1996 | ............ A47C 7/402 |

* cited by examiner

*Primary Examiner* — Milton Nelson, Jr.

(57) ABSTRACT

A backrest adjustment structure for a boat seat includes a backrest and a bracket. A bottom of the bracket is rotatably connected to a seat of a boat. A back of the backrest is provided with at least two spaced pivot bases. An upper end of at least one of the pivot bases has an upper restricting portion. A pivot shaft is formed on a top of the bracket. The pivot shaft is rotatably pivoted between the pivot bases. The bracket is selectively engaged with the upper restricting portion. The leaning angle is adjustable, meeting the needs of players.

8 Claims, 9 Drawing Sheets

BACKREST ADJUSTMENT STRUCTURE FOR BOAT SEAT

BACKGROUND OF THE INVENTION

1. Field of the Invention

The present invention relates to a backrest adjustment structure, and more particularly to a backrest adjustment structure for a boat seat.

2. Description of the Prior Art

With the improvement in living standards, outdoor sports have gradually become people's leisure and entertainment. Water sports are one of the more popular options for outdoor sports. In general, a boat is used as a common tool for water sports, which may be a kayak or a kanoe, etc. For the player to play comfortably, a boat is usually equipped with a backrest for the player's back to rest thereon. However, the backrest is fixedly connected to the seat, so the player cannot adjust the leaning angle. It is difficult to meet the needs of players.

SUMMARY OF THE INVENTION

The primary object of the present invention is to provide a backrest adjustment structure, which can adjust the leaning angle to meet the needs of players.

In order to achieve the above object, the present invention adopts the following technical solutions:

A backrest adjustment structure for a boat seat comprises a backrest and a bracket. A bottom of the bracket is rotatably connected to a seat of a boat. A back of the backrest is provided with at least two spaced pivot bases. An upper end of at least one of the pivot bases has an upper restricting portion. A pivot shaft is formed on a top of the bracket. The pivot shaft is rotatably pivoted between the pivot bases. The bracket is selectively engaged with the upper restricting portion.

Preferably, the bracket includes an upper bracket and a lower bracket. A top of the lower bracket is inserted into the upper bracket from a bottom of the upper bracket. A bottom of the lower bracket is rotatably connected to the seat of the boat. The pivot shaft is formed on a top of the upper bracket. The top of the lower bracket is selectively moved up and down relative to the upper bracket.

Preferably, at least one side of the upper bracket is provided with at least one elastic plate. The elastic plate and the lower bracket are connected through a protruding tooth to be engaged in a tooth groove. Along with the top of the lower bracket to be moved up and down relative to the upper bracket, the protruding tooth or the tooth groove is moved up and down relative to the upper bracket.

Preferably, the upper bracket is provided with a restricting member. The restricting member selectively presses the elastic plate for the protruding tooth to be engaged in the tooth groove.

Preferably, the restricting member includes a connecting shaft and a handle. The upper bracket is provided with two spaced connecting bases. Both ends of the connecting shaft are rotatably connected to the connecting bases. The connecting shaft is provided with a pressing block corresponding in position to the elastic plate and protruding toward the elastic plate. The handle is formed on a top of the connecting shaft. When the handle is rotated to disengage the pressing block from the elastic plate, the elastic plate elastically returns to its natural state, the protruding tooth is disengaged from the tooth groove, and the top of the lower bracket is moved up and down relative to the upper bracket. When the handle is rotated to lean against the upper bracket, the pressing block presses the elastic plate, so that the protruding tooth is engaged in the tooth groove, and the top of the lower bracket cannot be moved up and down relative to the upper bracket.

Preferably, one end of the handle is bent outwardly to for a bent portion. A lower end of at least one of the pivot bases has a lower restricting portion. The bracket is selectively engaged with the lower restricting portion.

Preferably, the elastic plate and the handle are disposed on a back of the upper bracket. The elastic plate includes two spaced elastic plates. The protruding tooth is disposed on a back of the elastic plate. The protruding tooth of each elastic plate includes two protruding teeth. The tooth groove includes a plurality of tooth grooves that are arranged in two spaced rows and disposed on a back of the lower bracket. The tooth grooves of each row are evenly spaced in a vertical direction on the lower bracket.

Preferably, the lower part of the lower bracket is formed with two spaced rope perforations. Both ends of an elastic rope are inserted through and detachably connected to the rope perforations, respectively. The lower part of the upper bracket is formed with two spaced rope holes. The elastic rope is looped around the top of the lower bracket, and is inserted through the rope holes.

Preferably, the top of the lower bracket is formed with two engaging grooves for the elastic rope to be looped. The two engaging moves are spaced apart from each other.

Preferably, the lower part of the back of the upper bracket is formed with a binding member hole, and a binding member is inserted through the binding member hole and is bound to the seat.

With the above technical solutions, in the present invention, the pivot bases are arranged on the back of the backrest to cooperate with the pivot shaft formed on the top of the bracket, and the bottom of the bracket is rotatably connected to the seat of the boat. The backrest is rotatably pivoted between the pivot bases through the pivot shaft so as to be rotatable relative to the bracket to adjust the leaning angle. Since the pivot base is provided with the upper restricting portion, the range of the leaning angle that the backrest is rotated upward relative to the bracket is restricted, so as to meet the needs of players. The bottom of the bracket is rotatably connected to the seat of the boat, so that when not in use, the bracket can be rotated to make the backrest attach to the seat of the boat; when in use, the bracket can be rotated to make the backrest move away from the seat of the boat and stand up.

DETAILED DESCRIPTION OF THE PREFERRED EMBODIMENTS

Figure 1:
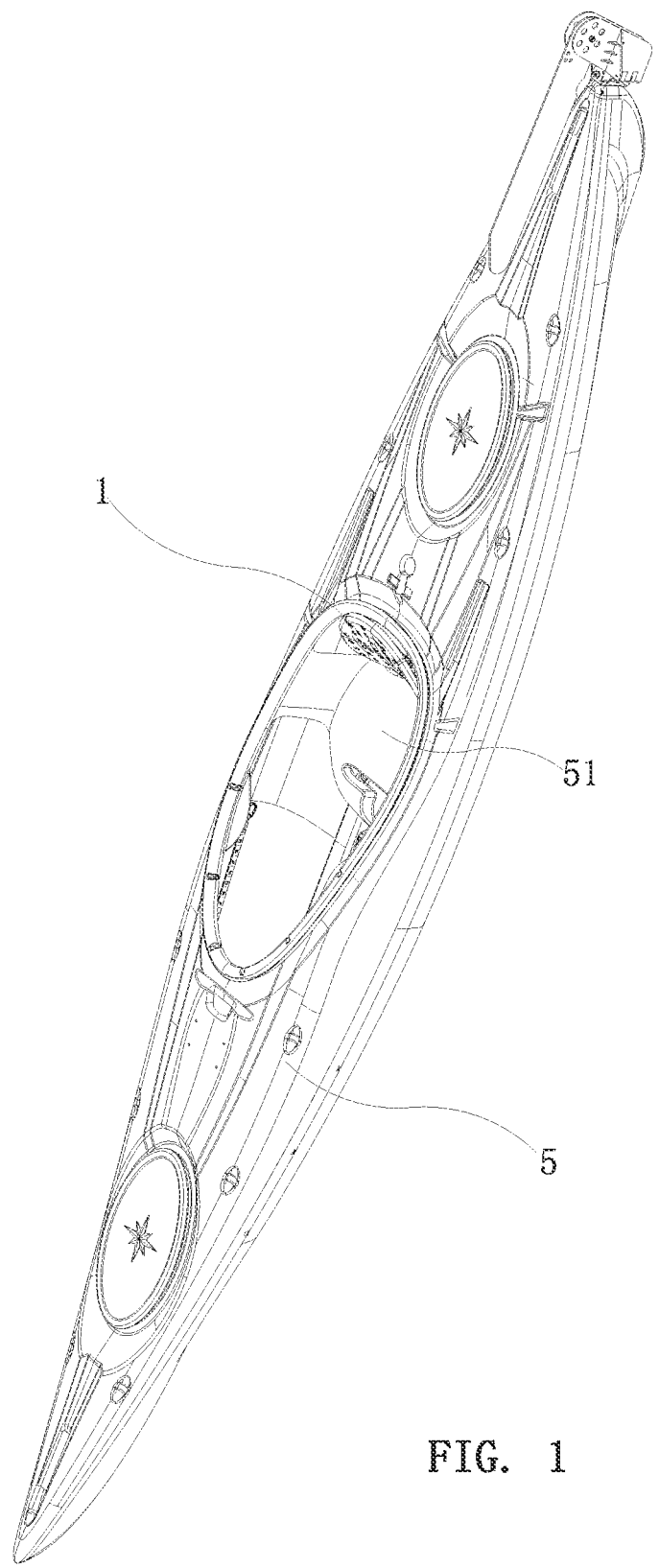
FIG. 1 is a schematic view of the present invention when in use.

Embodiments of the present invention will now be described, by way of example only, with reference to the accompanying drawings.

As shown in FIG. 1 through FIG. 9, the present invention discloses a backrest adjustment structure for a boat seat, comprising a backrest 1 and a bracket 2. The bottom of the bracket 2 is rotatably connected to a seat 51 of a boat 5. The back of the backrest 1 is provided with at least two spaced pivot bases 11. The upper end of at least one of the pivot bases 11 has an upper restricting portion 111. A pivot shaft 23 is formed on the top of the bracket 2. The pivot shaft 23 is rotatably pivoted between the pivot bases 11. The bracket 2 is selectively engaged with the upper restricting portion 111. Either end of the pivot shaft 23 is provided with are engaging ring 231 and is formed with a slit 232 extending in the axial direction. The end of the pivot shaft 23 passes through the corresponding pivot base 11 by narrowing the slit 232. After the end of the pivot shaft 23 passes through the corresponding pivot base 11, the slit 232 returns to its original state, such that the engaging ring 231 is engaged with the outside of the pivot base 11.

Therefore, present invention, the pivot bases 11 are arranged on the back of the backrest 1 to cooperate with the pivot shaft 23 formed on the top of the bracket 2, and the bottom of the bracket 2 is rotatably connected to the seat 51 of the boat 5. The backrest 1 is rotatably pivoted between the pivot bases 11 through the pivot shaft 23 so as to be rotatable relative to the bracket 2 to adjust the leaning angle. Since the pivot base 11 is provided with the upper restricting portion 111, the range of the leaning angle that the backrest 1 is rotated upward relative to the bracket 2 is restricted, so as to meet the needs of players. The bottom of the bracket 2 is rotatably connected to the seat 51 of the boat 5, so that when not in use, the bracket 2 can be rotated to make the backrest 1 attach to the seat 51 of the boat 5; when in use, the bracket 2 can be rotated to make the backrest 1 move away from the seat 51 of the boat 5 and stand up.

The range of the leaning angle that the backrest 1 is rotated downward relative to the bracket 2 can be achieved by the bracket 2 to be engaged with the backrest 1, or by the lower end of at least one oldie pivot bases 11 in this embodiment being provided with a lower restricting portion 112. The bracket 2 is selectively engaged with the lower restricting portion 112. The lower restricting portion 112 is configured to restrict the range of the leaning angle that the backrest 1 is rotated downward relative to the bracket 2.

In the embodiment, the number of pivot bases 11 provided on the back of the backrest 1 is two, and each pivot base 11 is provided with an upper restricting portion 111 and a lower restricting portion 112. The bottom of the bracket 2 is clamped by a clamp plate 4. The clamp plate 4 is locked to the seat 51 of the boat 5 by screws 6. The backrest 1 may have a plurality of perforations 12 arranged at intervals to provide ventilation. Further, in order to improve the convenience of use, the bracket 2 may include an upper bracket 21 and a lower bracket 22. The top of the lower bracket 22 is inserted into the upper bracket 21 from the bottom of the upper bracket 21. The bottom of the lower bracket 22 is rotatably connected to the seat 51 of the boat 5. The pivot shaft 23 is formed on the top of the upper bracket 21. The top of the lower bracket 22 can be selectively moved up and down relative to the upper bracket 21, so that the backrest 1 can be adjusted up and down together with the upper bracket 21 to adjust the height of the backrest 1 to better meet the needs of players.

Figure 2:
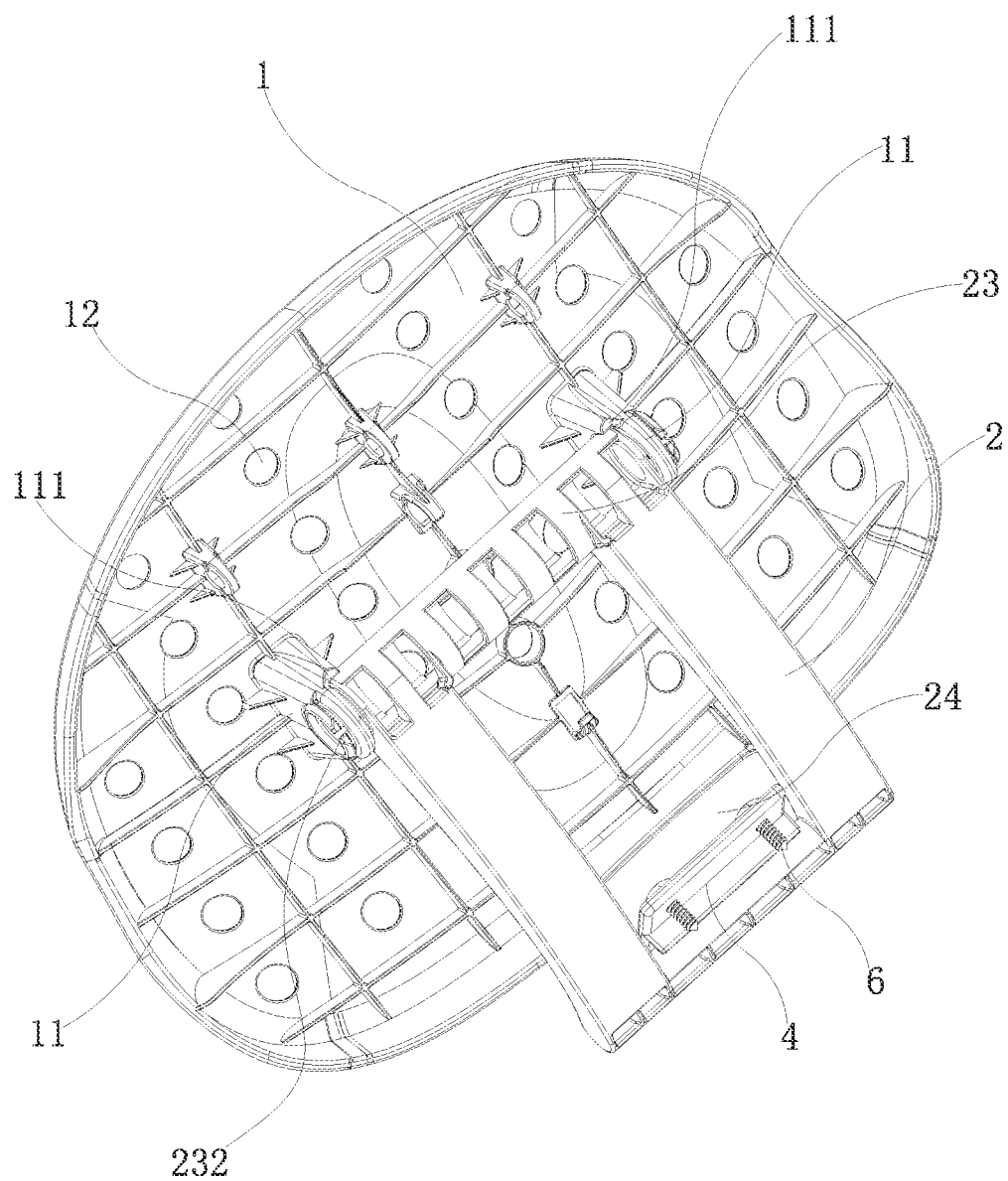
FIG. 2 is a perspective view according to a first embodiment of the present invention.
Figure 3:
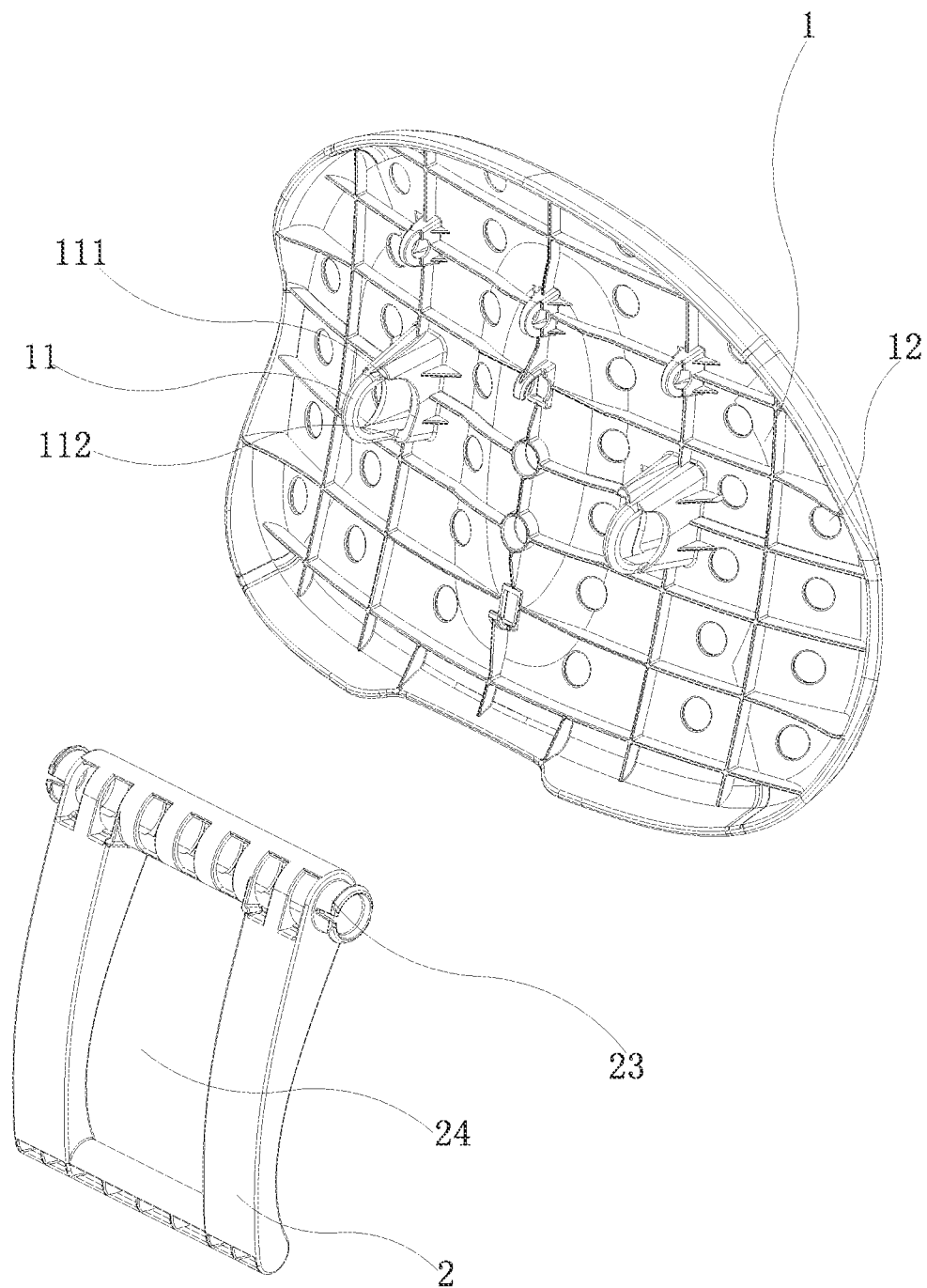
FIG. 3 is an exploded view according to the first embodiment of the present invention.

As shown in FIG. 2 to FIG. 9, the differences between the first embodiment, the second embodiment and the third embodiment of the present invention are as follows:

As shown in FIG. 2 and FIG. 3, the bracket 2 in the first embodiment of the present invention is an integrated structure. A hollow area 24 is formed in the middle of the bracket 2, which is convenient for the user's hand to hold the bracket 2 for installation. Besides, it is convenient for installing the clamp plate 4.

Figure 4:
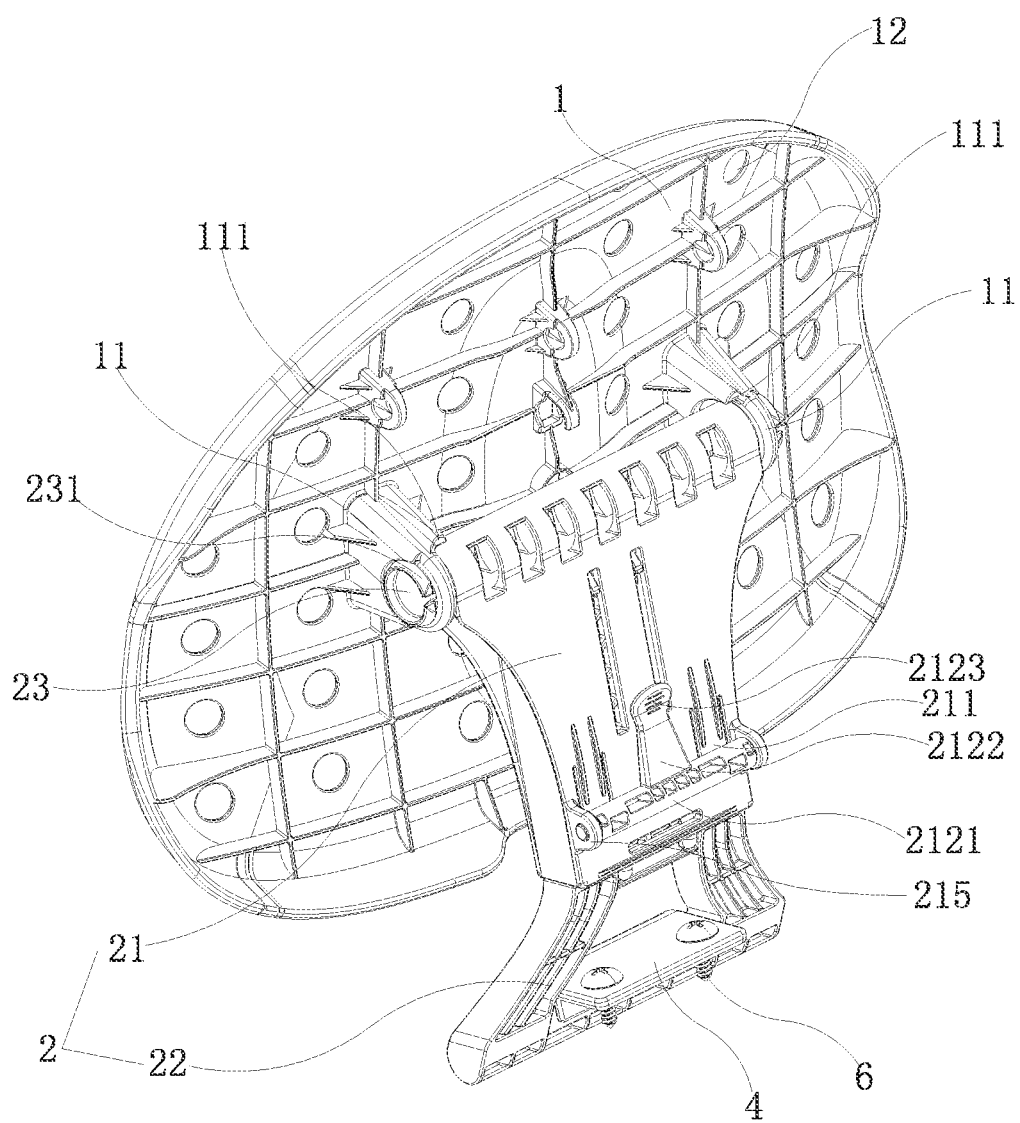
FIG. 4 is a perspective view according to a second embodiment of the present invention.
Figure 5:
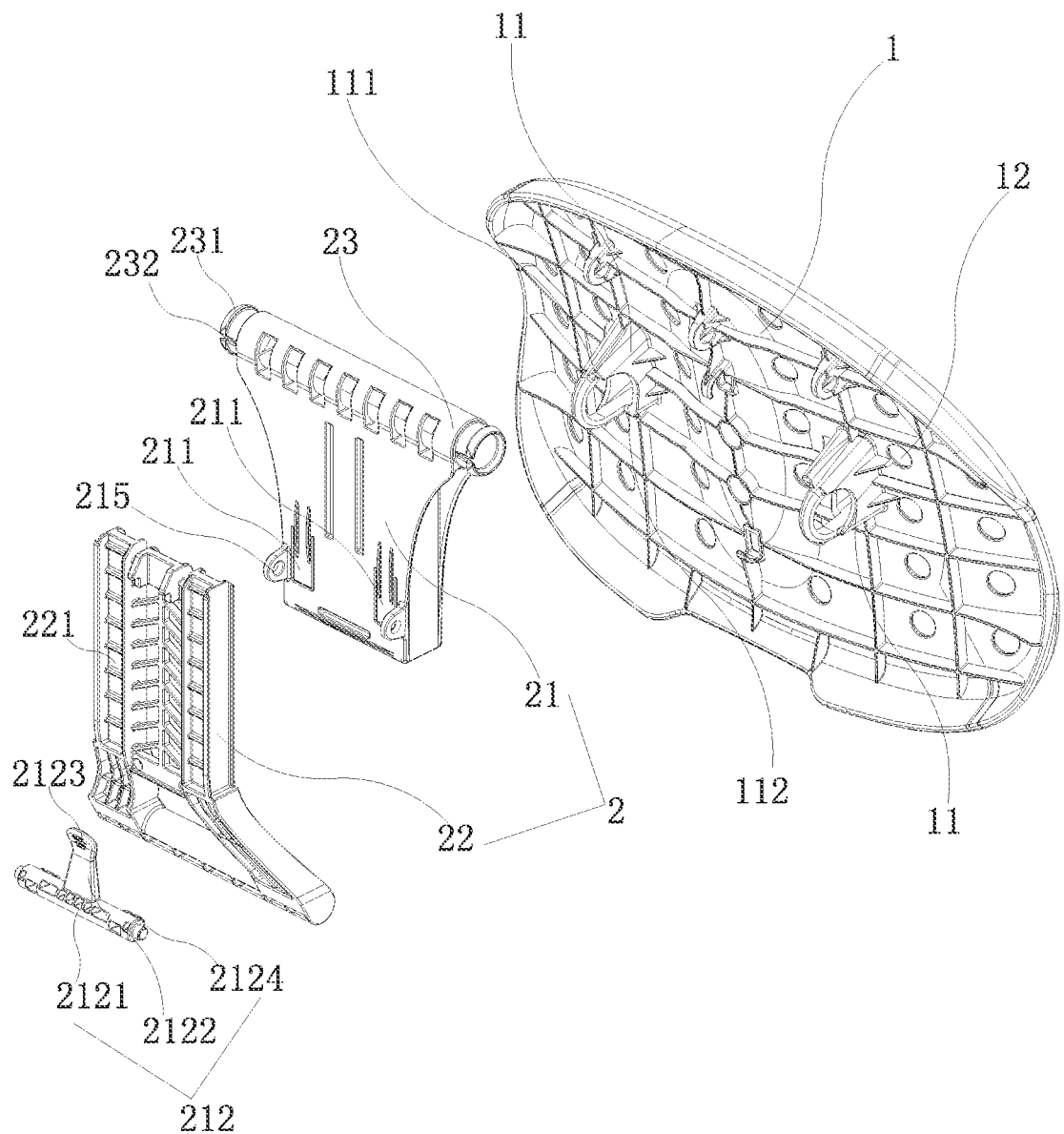
FIG. 5 is an exploded view according to the second embodiment of the present invention.
Figure 6:
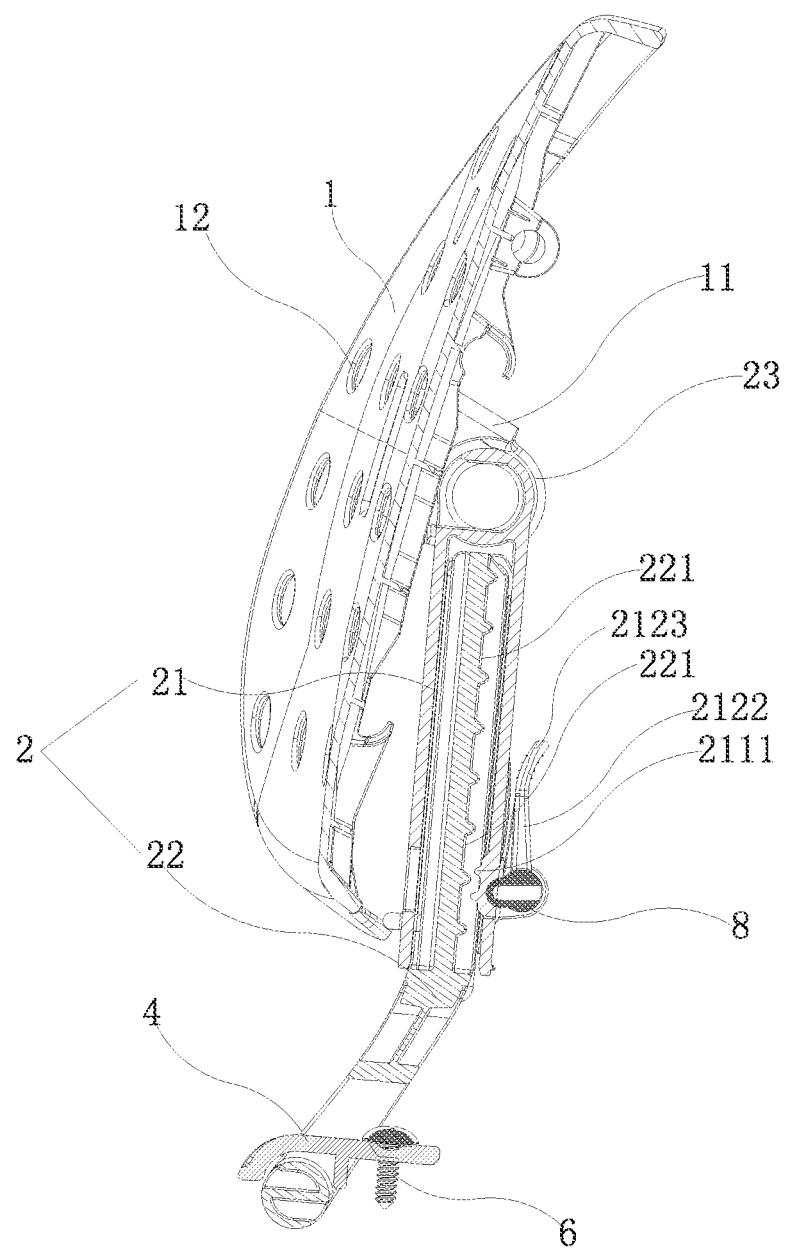
FIG. 6 is a cross-sectional view according to the second embodiment of the present invention.

As shown in FIG. 4 to FIG. 6, in the second embodiment of the present invention, in order to simplify the structure for the top of the lower bracket 22 to be selectively moved up and down relative to the upper bracket 21, at least one side of the upper bracket 21 is provided with at least one elastic plate 211. The elastic plate 211 and the lower bracket 22 are connected through a protruding tooth 2111 to be engaged in a tooth groove 221. Along with the top of the lower bracket 22 to be moved up and down relative to the upper bracket 21, the protruding tooth 2111 or the tooth groove 221 is moved up and down relative to the upper bracket 21.

Further, the upper bracket 21 may be provided with a restricting member 212. The restricting member 212 selectively presses the elastic plate 211 for the protruding tooth 2111 to be engaged in the tooth groove 221, thereby facilitating the control of the elastic plate 211 to cooperate with the lower bracket 22.

Furthermore, in order to facilitate the control of the restricting member 212 to selectively press the elastic plate 211, the restricting member 212 includes a connecting shaft 2121 and a handle 2122. The upper bracket 21 is provided with two spaced connecting bases 215. Both ends of the connecting shaft 2121 are rotatably connected to the connecting bases 215. The connecting shaft 2121 is provided with a pressing block 2124 corresponding in position to the elastic plate 211 and protruding toward the elastic plate 211. The handle 2122 is formed on the top of the connecting shaft 2121. When the handle 2122 is rotated to disengage the pressing block 2124 from the elastic plate 211, the elastic plate 211 elastically returns to its natural state, the protruding tooth 2111 is disengaged from the tooth groove 221, and the top of the lower bracket 22 is moved up and down relative to the upper bracket 21. When the handle 2122 is rotated to lean against the upper bracket 21, the pressing block 2124 presses the elastic plate 211, so that the protruding tooth 2111 is engaged in the tooth groove 221, and the top of the lower bracket 22 cannot be moved up and down relative to the upper bracket 21.

In order to facilitate the operation of the handle 2122, the end of the handle 2122 is bent outwardly to form a bent portion 2123.

In this embodiment, in order to prevent the handle 2122 and the elastic plate 211 from being operated incorrectly, both the elastic plate 211 and the handle 2122 are disposed on the back of the upper bracket 21. The elastic plate 211 includes two spaced elastic plates. The protruding tooth 2111 is disposed on the back of the elastic plate 211. The protruding tooth 2111 of each elastic plate 211 includes two protruding teeth. The tooth groove 221 includes a plurality of tooth grooves that are arranged in two spaced rows and disposed on the back of the lower bracket 22. The tooth grooves 221 of each row are evenly spaced in a vertical direction on the lower bracket 22. In the present invention, the two protruding teeth 2111 may be engaged in one tooth groove 221, or the two protruding teeth 2111 may span two of the tooth grooves 221, thereby achieving a stepless adjustment.

Figure 7:
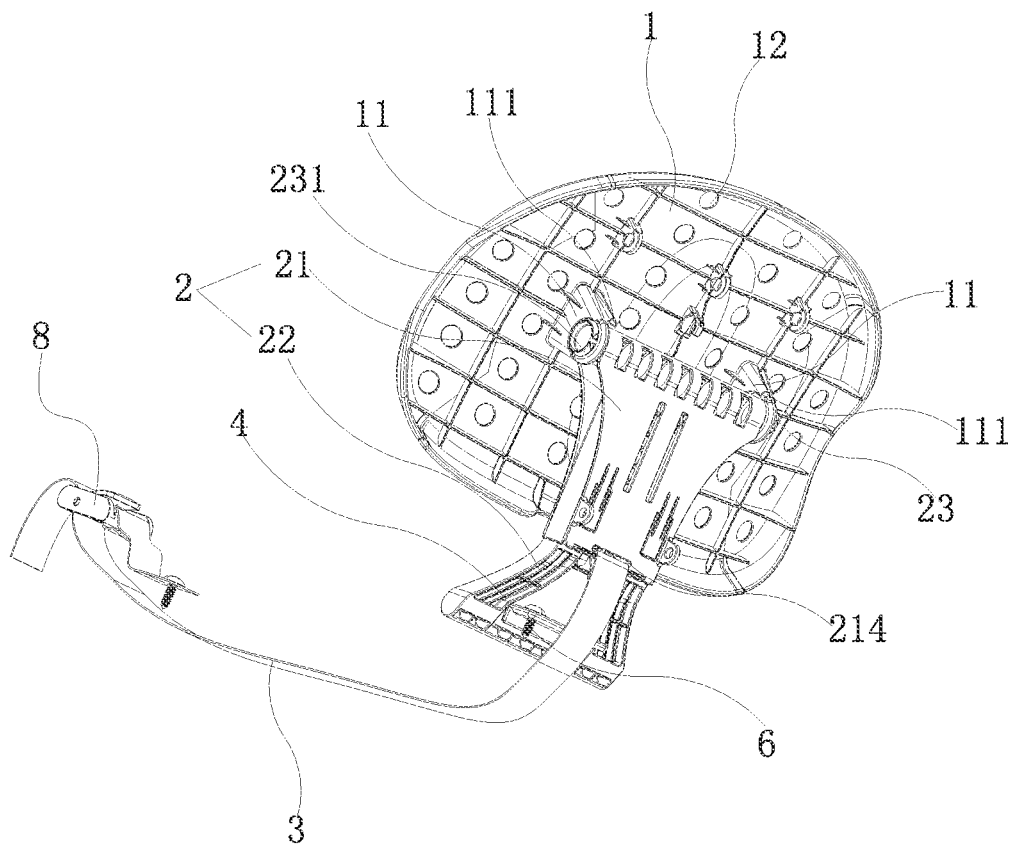
FIG. 7 is a rear perspective view according to a third embodiment of the present invention.
Figure 8:
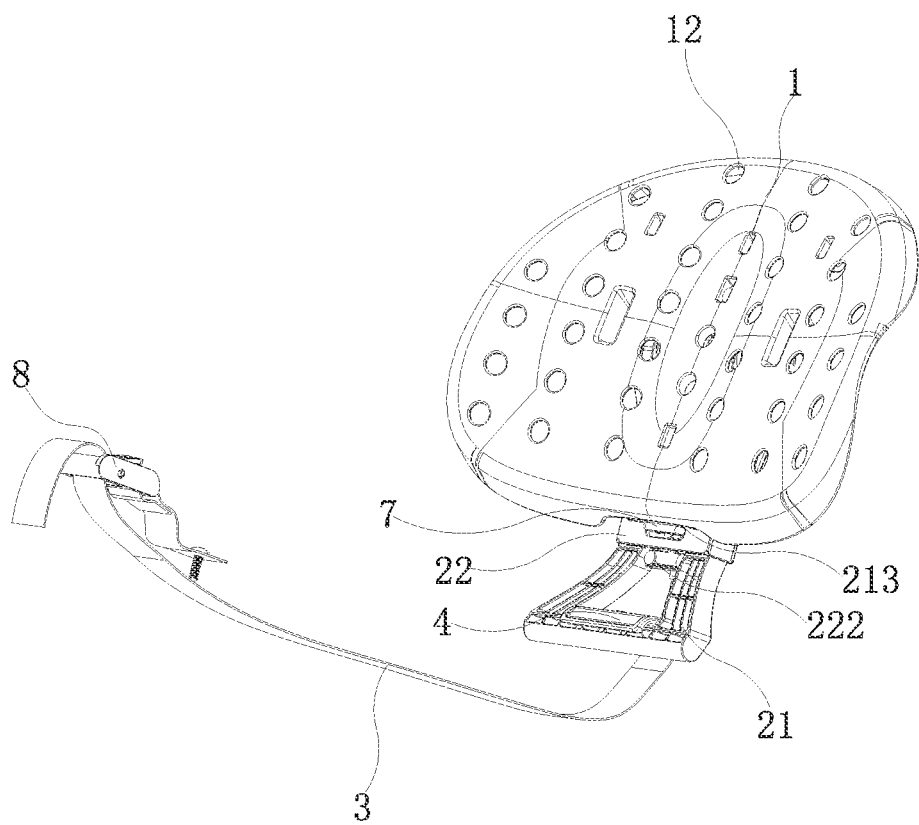
FIG. 8 is a front perspective view according to a third embodiment of the present invention.
Figure 9:
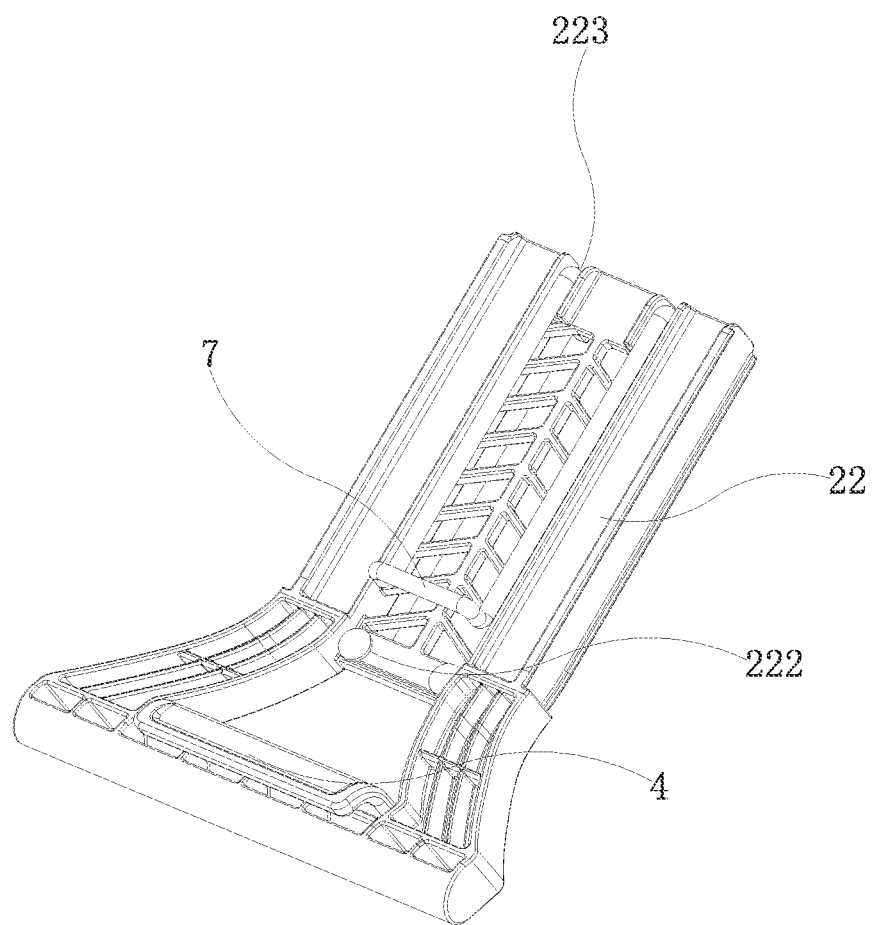
FIG. 9 is a perspective view of the lower bracket and the elastic rope according to the third embodiment of the present invention.

As shown in FIG. 7 to FIG. 9, in the third embodiment of the present invention, the lower part of the lower bracket 22 may be formed with two spaced rope perforations 222. Both ends of an elastic rope 7 are inserted through and detachably connected to the rope perforations 222, respectively. The lower part of the upper bracket 21 is formed with two spaced rope holes 213. The elastic rope 7 is looped around the top of the lower bracket 22, and is inserted through the rope holes 213, so that the top of the lower bracket 22 is controlled to move up and down relative to the upper bracket 21 by using the elastic force of the elastic rope 7. When the top of the lower bracket 22 is closer to the inner top of the upper bracket 21, the elastic rope 7 is stretched longer. With the elastic recovery of the elastic rope 7, the top of the lower bracket 22 is gradually moved away from the inner top of the upper bracket 21, so that the top of the lower bracket 22 can be moved up and down relative to the upper bracket 21.

For the backrest 1 to be moved up and down smoothly to adjust the height, the top of the lower bracket 22 may be formed with two engaging grooves 223 for the elastic rope 7 to be looped. The two engaging grooves 223 are spaced apart from each other.

Further, the lower part of the back of the upper bracket 21 is formed with a binding member hole 214, and a binding member 3 is inserted through the binding member hole 214 and is hound to the seat 51. When the elastic rope 7 is elastically deformed or elastically restored to make the backrest 1 move downward or upward to the desired height, the binding member 3 is bonded to the seat 51 so that the height of the backrest 1 does not change. Alternatively, the binding member 3 can pull the upper bracket 21 to move downward. The user can adjust the backrest 1 to the desired height by pulling the binding member 3 to drive the upper bracket 21 to move downward. Then, the binding member 3 is secured to the seat 51 throe a restricting buckle 8 connected to the binding member 3. The binding member 3 may be a rope or a braided belt. The binding member 3 shown in the figure is a braided belt.

Although particular embodiments of the present invention have been described in detail for purposes of illustration, various modifications and enhancements tray be made without departing from the spirit and scope of the present invention. Accordingly, the present invention is not to be limited except as by the appended claims.

What is claimed is:

1. A backrest adjustment structure for a boat seat, comprising a backrest and a bracket, a bottom of the bracket being rotatably connected to a seat of a boat, a back of the backrest being provided with at least two spaced pivot bases, an upper end of at least one of the pivot bases having an upper restricting portion, a pivot shaft being formed on a top of the bracket, the pivot shaft being rotatably pivoted between the pivot bases, the bracket being selectively engaged with the upper restricting portion;

the bracket includes an upper bracket and a lower bracket, a top of the lower bracket is inserted into the upper bracket from a bottom of the upper bracket, a bottom of the lower bracket is rotatably connected to the seat of the boat, the pivot shaft is formed on a top of the upper bracket, and the upper bracket is movable up or down relative to the lower bracket to achieve height adjustment of the backrest;

at least one side of the upper bracket is provided with at least one elastic plate, the elastic plate and the lower bracket are connected through a protruding tooth to be engaged in a tooth groove, along with the top of the lower bracket to be moved up and down relative to the upper bracket, the protruding tooth or the tooth groove is moved up and down relative to the upper bracket.

2. The backrest adjustment structure as claimed in claim 1, wherein the elastic plate and a handle are disposed on a back of the upper bracket, the elastic plate includes two spaced elastic plates, the protruding tooth is disposed on a back of the elastic plate, the protruding tooth of each elastic plate includes two protruding teeth, the tooth groove includes a plurality of tooth grooves that are arranged in two spaced rows and disposed on a back of the lower bracket, and the tooth grooves of each row are evenly spaced in a vertical direction on the lower bracket.

3. The backrest adjustment structure as claimed in claim 1, wherein the upper bracket is provided with a restricting member, and the restricting member selectively presses the elastic plate for the protruding tooth to be engaged in the tooth groove.

4. The backrest adjustment structure as claimed in claim 3, wherein the elastic plate and a handle are disposed on a back of the upper bracket, the elastic plate includes two spaced elastic plates, the protruding tooth is disposed on a back of the elastic plate, the protruding tooth of each elastic plate includes two protruding teeth, the tooth groove includes a plurality of tooth grooves that are arranged in two spaced rows and disposed on a back of the lower bracket, and the tooth grooves of each row are evenly spaced in a vertical direction on the lower bracket.

5. The backrest adjustment structure as claimed in claim 3, wherein the restricting member includes a connecting shaft and a handle, the upper bracket is provided with two spaced connecting bases, both ends of the connecting shaft are rotatably connected to the connecting bases, the connecting shaft is provided with a pressing block corresponding in position to the elastic plate and protruding toward the elastic plate, the handle is formed on a top of the connecting shaft, when the handle is rotated to disengage the pressing block from the elastic plate, the elastic plate elastically returns to its natural state, the protruding tooth is disengaged from the tooth groove, and the top of the lower bracket is moved up and down relative to the upper bracket; when the handle is rotated to lean against the upper bracket, the pressing block presses the elastic plate, so that the protruding tooth is engaged in the tooth groove, and the top of the lower bracket cannot be moved up and down relative to the upper bracket.

6. The backrest adjustment structure as claimed in claim 5, wherein one end of the handle is bent outwardly to form a bent portion, a lower end of at least one of the pivot bases has a lower restricting portion, and the bracket is selectively engaged with the lower restricting portion.

7. The backrest adjustment structure as claimed in claim 6, wherein the elastic plate and the handle are disposed on a back of the upper bracket, the elastic plate includes two spaced elastic plates, the protruding tooth is disposed on a back of the elastic plate, the protruding tooth of each elastic plate includes two protruding teeth, the tooth groove includes a plurality of tooth grooves that are arranged in two spaced rows and disposed on a back of the lower bracket, and the tooth grooves of each row are evenly spaced in a vertical direction on the lower bracket.

8. The backrest adjustment structure as claimed in claim 5, wherein the elastic plate and the handle are disposed on a back of the upper bracket, the elastic plate includes two spaced elastic plates, the protruding tooth is disposed on a back of the elastic plate, the protruding tooth of each elastic plate includes two protruding teeth, the tooth groove includes a plurality of tooth grooves that are arranged in two spaced rows and disposed on a back of the lower bracket, and the tooth grooves of each row are evenly spaced in a vertical direction on the lower bracket.

\* \* \* \* \*